Patented Feb. 24, 1953

2,629,740

UNITED STATES PATENT OFFICE 2,629,740

POLYETHER AMINES AND A PROCESS FOR THEIR PRODUCTION

Joseph J. Carnes, Greenwich, Conn., assignor to American Cyanamid Company, New York, N. Y., a corporation of Maine No Drawing. Application May 4, 1948, Serial No. 25,073

4 Claims. (Cl. 260—584)

The present invention relates to the preparation of polyether amines.

It is an object of this invention to prepare secondary amines of the general formula

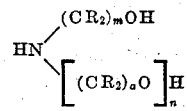

in which $m$ is 2 or 3, R is hydrogen or aliphatic, $a$ is an integer greater than 1, and $n$ is an integer. Such compounds are valuable as intermediates, particularly in the synthesis of surface active agents and for other purposes. These amines can be prepared easily from inexpensive materials such as acetone, ethanolamine, and ethylene oxide. Since the acetone or other carboxy-containing compound used is recoverable, the more expensive aldehydes are likewise economically suitable, for example, benzaldehyde and the like.

The process for making the polyether amines may be described briefly as follows. A plural-carbon aldehyde or ketone such as acetaldehyde, acetone, benzaldehyde, isobutyraldehyde, and an alkylol amine such as ethanolamine are dissolved in a suitable solvent and reacted for a suitable period of time in an apparatus which permits stripping out the by-product water as it is formed. There remains dissolved in the solvent a 2-substituted oxazolidine. The solvent is distilled off and the oxazolidine is left in the still. The oxazolidine is then reacted with a compound containing the group

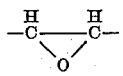

such as ethylene oxide, glycidol, or the like, in a suitable solvent. It appears that the epoxy compound adds at the nitrogen atom of the oxazolidine ring, and that a fairly large number of moles of epoxy compound (up to 100) may be so added, creating in effect a poly ether side chain terminating in hydroxyl. However, the applicant does not wish to be bound by any supposed course of reaction. Following the condensation the solvent and other volatile materials formed during the course of the reaction are distilled off under subatmospheric pressure, and the condensation compound remaining is hydrolyzed with water whereby the original aldehyde or ketone and a polyether amine are formed. The aldehyde or ketone is extracted with a solvent that does not affect the amine, such as benzene or the like, leaving in the reaction vessel the desired polyether amine.

The process is not confined to the oxazolidines. The 6-membered ring made by reacting propanolamine with a plural-carbon aldehyde or a ketone also condenses with epoxy compounds of the type described to give hydrolyzable N-substituted polyether amines. The ring may be formed with almost any of the commoner aldehydes or ketones. Preference is given to the less expensive ones purely from the viewpoint of economy; therefore acetone is preferred for the reaction. Although the two substituents on the carbonyl group of the aldehyde or ketone are susceptible to a wide degree of variation, it is preferable to leave them fairly simple.

A great variety of epoxy compounds is available. Ethylene oxide is preferred because of its relative cheapness, but ethylene oxide derivatives such as propylene oxide, glycidol, butadiene monoxide, and isobutylene oxide are also suitable. If ethylene oxide is used, the speed of reaction may be increased by employing a suitable catalyst such as triethylamine. The excess of epoxy compound may be varied over wide limits. Obviously, at least one mole of epoxy compound must be used for each mole of substituted oxazolidine. No preference as to the ratio of epoxy compound to oxazolidine compound may be stated, as it is clear that this will depend upon the end product desired.

All the reactions discussed may be carried out by refluxing at atmospheric pressure, and this mode of preparation is especially preferable in making the compound containing the oxazolidine ring, in which process it is desirable to strip out water during the reaction. However, the actual condensation of the oxazolidine compound with the epoxy compound may be carried out in an autoclave if desired. In all cases solvents are preferably distilled under reduced pressure to avoid decomposition of the condensation product and of the final polyether amine.

The following examples illustrate the invention. While specific details are described, it will be understood that these examples are given primarily for the purpose of illustration and that the invention in its broader aspects is not limited thereto.

*Preparation of oxazolidines*

EXAMPLE 1

2-phenyloxazolidine

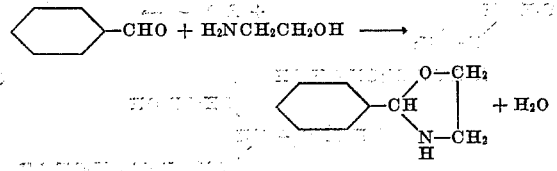

A mixture of 212 g. (2.0 moles) of benzaldehyde, 126 g. (2.0 moles+1% excess) of 98% ethanolamine, and 150 ml. of benzene was refluxed with stirring for three and a half hours, stripping out the water in a trap. After 37.5 ml. of water was collected, the benzene was distilled off under water pump pressure. The residue was distilled through a Vigreux column. There was collected 227 g. of 2-phenyloxazolidine, a clear, colorless product boiling at 93–4° C./0.8 mm., a 76% yield.

EXAMPLE 2
2-isopropyloxazolidine

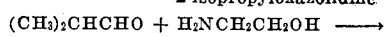
(CH₃)₂CHCHO + H₂NCH₂CH₂OH ⟶

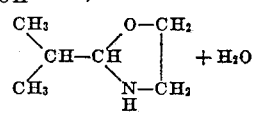

By the same procedure, isobutyraldehyde 72 g. (1.0 mole) was condensed with 61 g. (1.0 mole) of ethanolamine in 250 ml. of benzene. The yield of 2-isopropyloxazolidine, a clear, colorless liquid boiling at 55–9° C./15 mm., was 91 g., 79% of theory.

EXAMPLE 3
2,2-dimethyl-4-ethyloxazolidine

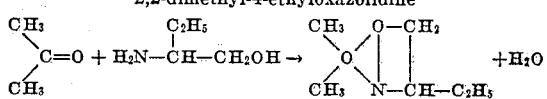

Acetone, 48 g. (0.83 mole), and 74 g. (0.83 mole) of 2-aminobutanol-1 were condensed in 200 ml. of refluxing benzene as above. The 2,2-dimethyl-4-ethyloxazolidine was a clear, colorless liquid boiling at 57–60° C./25 mm. The yield was 68 g., 64% of theory.

*Condensation of oxazolidines with alkylene oxides and hydrolysis to secondary polyetheramines*

EXAMPLE 4
2-phenyloxazolidine + 10 moles ethylene oxide

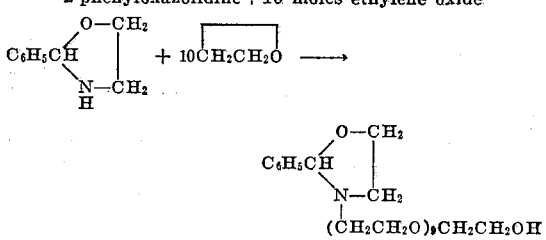

A solution of 100 g. (0.672 mole) of 2-phenyloxazolidine as prepared in Example 1, and 7 g. of triethylamine in 100 ml. of sec.-butyl alcohol was placed in a flask fitted with stirrer, thermometer, gas inlet tube, and cold reflux condenser. The solution was heated to 100° C. and ethylene oxide from a weighed tank was passed in at 90–100° C. until 297 g. (6.75 moles) had been absorbed. This required ten hours. After heating for an additional three and a half hours at 100–105° C., refluxing had ceased.

The solvent and volatile materials were distilled off under water pump pressure up to 130° C. The polyglycol substituted-2-phenyloxazolidine was a dark red, viscous oil.

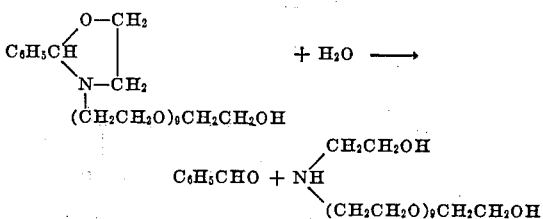

The polyglycol substituted-2-phenyloxazolidine was mixed with 700 ml. of water, giving a turbid brown dispersion. After heating for two hours on the steam bath, the benzaldehyde was extracted from the mixture with two 200 ml. portions of benzene.

The water and a further small amount of benzaldehyde were distilled off under water pump pressure up to 100° C. The polyglycol substituted ethanolamine was a dark red oil. The yield was 314 g., 93% of theory.

EXAMPLE 5
2-phenyloxazolidine + 35 moles ethylene oxide

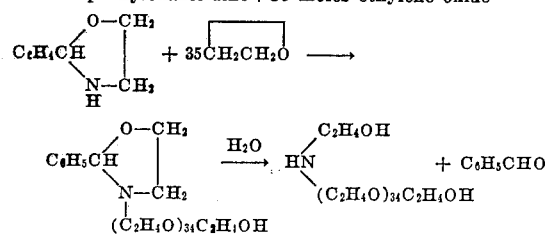

In this preparation, 25 g. (0.167 mole) of 2-phenyloxazolidine as prepared in Example 1 in 25 ml. of sec.-butyl alcohol was condensed with 250 g. (5.68 moles) of ethylene oxide in the presence of 2 g. of triethylamine as catalyst. The procedure was the same as in Example 4. The polyglycol amine, obtained by stripping and hydrolysis of the condensation product as above, was a brown, viscous, water-soluble oil. The yield was 266 g.

EXAMPLE 6
2-phenyloxazolidine + 4 moles glycidol

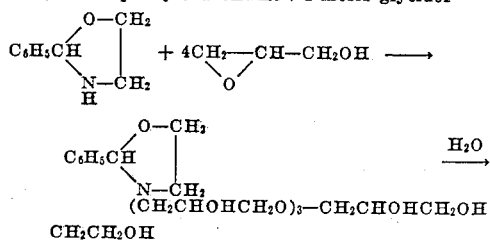

Glycidol, 30 g. (0.405 mole) was added dropwise with stirring to 15.1 g. (0.101 mole) of 2-phenyloxazolidine as prepared in Example 1 at 150–160° C. The reaction was exothermic and no heating was required during the addition.

After heating for another hour at 155–160° C., the mixture was cooled. The condensation product was hydrolyzed by heating on the steam bath with 100 ml. of water. The benzaldehyde was extracted from the hydrolysis mixture with benzene and the water was stripped from the remaining aqueous solution under the reduced pressure of the water pump up to a temperature of 110° C. The resulting polyglycerol substituted ethanolamine was an amber, viscous syrup soluble in water. The yield was 36 g., 100% of theory.

EXAMPLE 7
2-isopropyloxazolidine + 2 moles propylene oxide

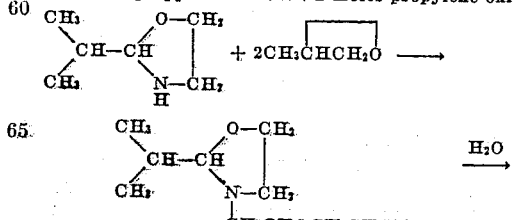

A mixture of 29 g. (0.25 mole) of 2-isopropyloxazolidine as prepared in Example 2 and 29 g. (0.50 mole) of propylene oxide was placed in a stainless steel autoclave and heated at 165° C. until the pressure had fallen to approximately 30 p. s. i. and remained constant.

The clave was cooled and the condensation product was removed and hydrolyzed with water on the steam bath as in preceding examples. After extraction of the aqueous solution with benzene to remove the isobutyraldehyde, the N-hydroxypropyloxypropylethanolamine was isolated by distilling off the water under reduced pressure up to a temperature of 110° C. The amine was a dark red, water-soluble oil. The yield was 40 g., 91% of theory.

EXAMPLE 8

2,2-dimethyl-4-ethyloxazolidine + 4.3 moles ethylene oxide

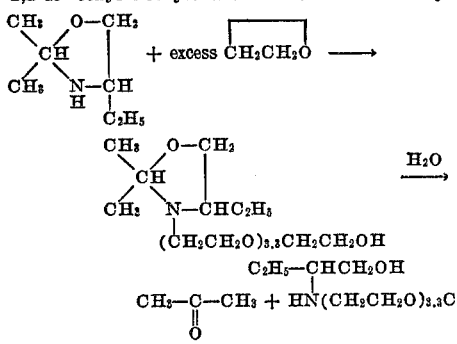

Ethylene oxide was passed as in Example 1 into a solution of 32 g. (0.25 mole) of 2,2-dimethyl-4-ethyloxazolidine prepared as per Example 3, and 2.5 g. of triethylamine in 25 ml. of sec.-butyl alcohol until 55 g. (1.25 moles) of the oxide had been absorbed. This addition required eight hours at 85–99° C.

After the mixture had been heated for three hours at 90–95° C., the solvent and volatile materials were distilled off up to 155° C. at 35 mm. pressure. Some unreacted oxazolidine distilled over at this point. The residual condensation product was hydrolyzed with water and the amine was isolated as in the preceding examples. There was obtained 43 g. of dark red, water-soluble oil, a 54% yield. Analysis of this material indicated an equivalent weight of 321, showing that an average of 4.3 moles of ethylene oxide had condensed with the 2,2-dimethyl-4-ethyloxazolidine to form the last compound shown in the above series of equations.

While this invention has been described with reference to specific embodiments, it is to be understood that it is not to be limited thereto, but is to be construed broadly and limited only by the scope of the appended claims.

I claim:

1. The process which comprises condensing $n$ moles of an epoxy compound of the type

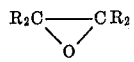

with one mole of a heterocyclic compound of the type

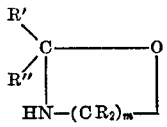

hydrolyzing the condensation product, whereby a secondary amine of the type

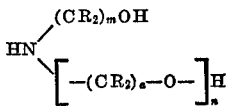

is formed, and recovering said amine; $a$ being an integer from 1 to 4 inclusive, $m$ being 2 to 3 inclusive, R being a member of the group consisting of H and alkyl hydrocarbon radicals, R' being a member of the group consisting of H, alkyl hydrocarbon, and aromatic hydrocarbon radicals, R'' being a member of the group consisting of alkyl hydrocarbon and aromatic hydrocarbon radicals, and $n$ being 2–100.

2. The process of claim 1 in which the epoxy compound is ethylene oxide and the heterocyclic compound is 2,2-dimethyl oxazolidine.

3. The process of claim 1 in which the epoxy compound is propylene oxide and the heterocyclic compound is 2-phenyl oxazolidine.

4. The process of claim 1 in which the epoxy compound is glycidol and the heterocyclic compound is 2-isopropyl oxazolidine.

JOSEPH J. CARNES.

REFERENCES CITED

The following references are of record in the file of this patent:

UNITED STATES PATENTS

| Number | Name | Date |
|---|---|---|
| 2,205,042 | Lehner et al. | June 18, 1940 |
| 2,231,759 | De Groote | Feb. 11, 1941 |
| 2,297,221 | Huttenlocher | Sept. 29, 1942 |

OTHER REFERENCES

Trusler, Ind. and Eng. Chem., vol. 21, page 685 (1929).